United States Patent [19]

Balukin

[11] 4,113,320

[45] Sep. 12, 1978

[54] BRAKE VALVE DEVICE

[75] Inventor: Richard F. Balukin, Penn Hills, Pa.

[73] Assignee: Westinghouse Air Brake Company, Wilmerding, Pa.

[21] Appl. No.: 835,123

[22] Filed: Sep. 21, 1977

[51] Int. Cl.² ............................................. B60T 15/06
[52] U.S. Cl. ..................................................... 303/54
[58] Field of Search ........................ 303/50, 54, 33, 35

[56] References Cited

U.S. PATENT DOCUMENTS

| 2,905,507 | 9/1959 | May | 303/50 |
|---|---|---|---|
| 2,958,561 | 11/1960 | May | 303/8 |
| 3,260,553 | 7/1966 | Jeffrey | 303/16 |
| 3,504,950 | 4/1970 | McClure | 303/35 |

Primary Examiner—Trygve M. Blix
Assistant Examiner—Reinhard J. Eisenzopf
Attorney, Agent, or Firm—W. F. Poore; R. W. McIntire, Jr.

[57] ABSTRACT

This invention relates to a brake valve device having a fluid pressure operated relay valve device for varying the pressure in a train brake pipe in accordance with the degree of fluid under pressure supplied to an equalizing reservoir and the relay valve device by a control valve device wherein the control valve device is operative, in a release position of a brake valve handle, in the manner of a self-lapping valve device to establish a preselected pressure of the fluid supplied to the equalizing reservoir and the relay valve device, and, in a service and lap position of the brake valve handle, in the manner of a manually-operated brake valve device, to release fluid under pressure from the equalizing reservoir and relay valve device to atmosphere. Therefore, the time that the handle remains in the service position determines the degree of reduction of the pressure of the fluid in the equalizing reservoir and the relay valve device. Upon manual return of the handle to its release position, the control valve device operates in the manner of a self-lapping control valve device to effect charging of the equalizing reservoir to a preselected pressure which operates the relay valve device to effect charging of the train brake pipe to this preselected pressure.

10 Claims, 1 Drawing Figure

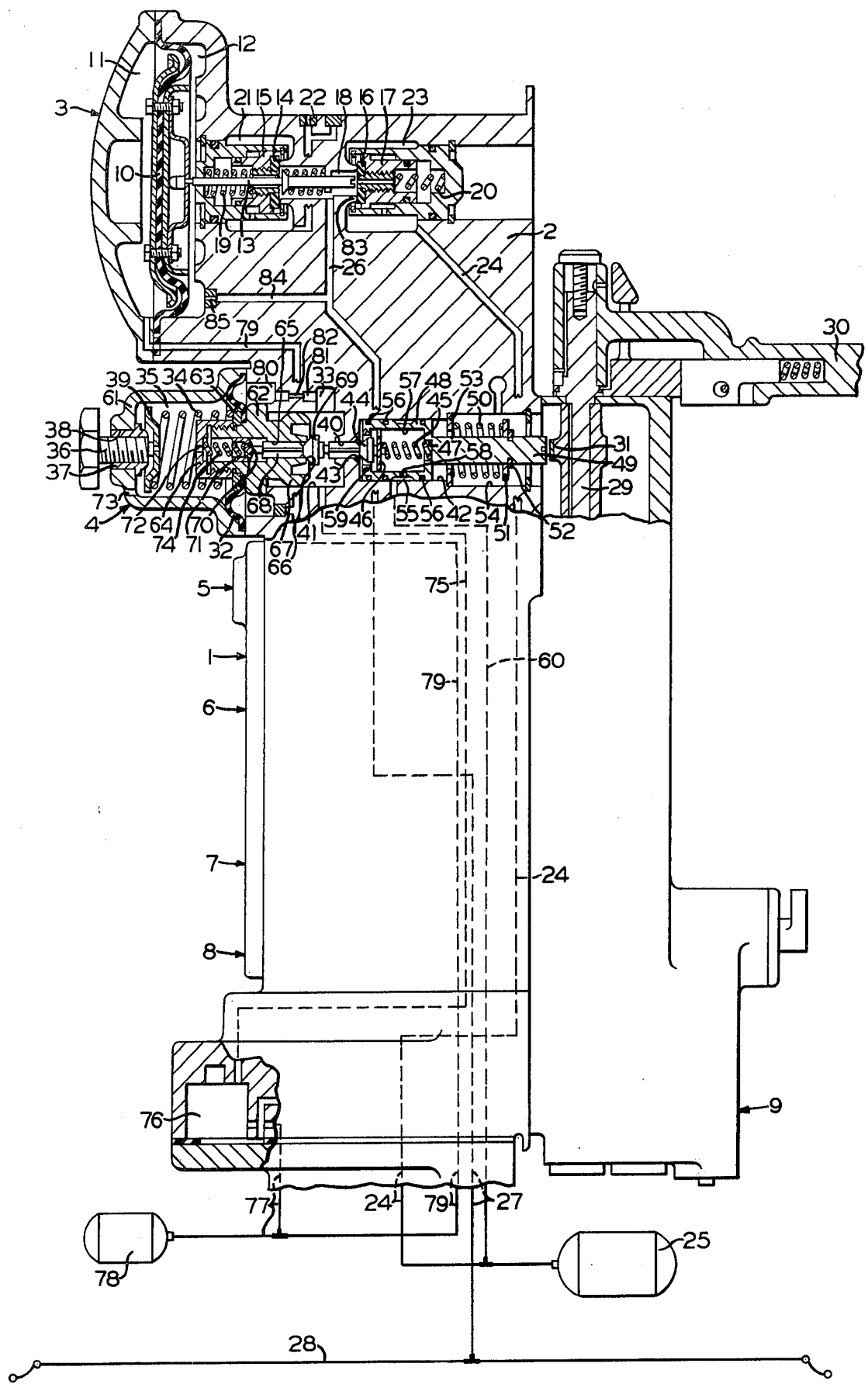

BRAKE VALVE DEVICE

BACKGROUND OF THE INVENTION

In U.S. Pat. No. 2,905,507 issued Sept. 22, 1959 to Harry C. May, and assigned to the assignee of the present invention, there is shown and described a self-lapping type of brake valve device that is automatically operative to effect, upon manually shifting a brake valve handle out of a release position and to a selected position in an application zone, a reduction of the pressure in an equalizing reservoir to a value corresponding to the position in the application zone to which the brake valve handle was shifted whereupon a relay valve device operated in response to this reduction of the pressure in the equalizing reservoir to effect a corresponding reduction of the pressure in a train brake pipe.

In recent years, there has been a slight reversion in brake equipment used in passenger and commuter service to the use of a brake valve device that is so constructed as to automatically charge a train brake pipe to a preselected chosen pressure, while the handle of this brake valve device occupies its release position, and require manual shifting of this handle in one direction to a service position to effect a reduction of pressure in the train brake pipe and thereafter shifting in an opposite direction to a lap position to terminate a reduction of the pressure in the brake pipe, since such a brake valve device is suitable to control the operation of car brake control valve devices of the direct release type which are capable of providing the necessary braking requirements for certain cars used in passenger and commuter service, it being understood that direct release brake control valve devices are less expensive than the graduated release type of brake control valve devices.

Brake valve devices that are substantially the same in construction and operation as the brake valve device shown and described in the above-mentioned U.S. Pat. No. 2,905,507 are presently manufactured and sold in large quantities whereas the manufacturing facilities for the mass production of the older heretofore used manually lapped brake valve devices are obsolete or have been discarded.

Accordingly, it is the general purpose of the present invention to provide a brake valve device that embodies a large number of the elements embodied in the presently manufactured self-lapping type of brake valve device with a minumum number of the elements of this brake valve device replaced by new elements which enable the provision of a brake valve device that is automatically operative to charge a train brake pipe to a preselected chosen pressure while its operating handle occupies a release position and manually lapped by movement of this handle from a service position to a lap position subsequent to its movement to the service position. It is readily apparent that such a modified brake valve device can be manufactured less expensively than the older types of manually lapped brake valve devices since these devices embodied therein a rotary valve and a valve seat each of which required a considerable amount of accurate machining that necessarily increased the cost of these brake valve devices.

SUMMARY OF THE INVENTION

According to the present invention, a novel brake valve device is provided which embodies therein a control valve device so constructed and operated by a cam mounted on an operating handle shaft as to automatically supply fluid under pressure to charge an equalizing reservoir to a chosen preselected value while the handle occupies its release position. A relay valve device embodied in this brake valve device and operated by a reduction of the pressure of the fluid in the equalizing reservoir effects a corresponding reduction of the pressure in a train brake pipe accordingly as this cam is manually rotated by the brake valve handle from its release position to a service position and subsequently to a lap position to effect operation of a control valve device to reduce the pressure of the fluid in the equalizing reservoir to a degree in accordance with the length of time the handle and cam are allowed to remain in the service position prior to the subsequent movement to the lap position.

In the accompanying drawing:

The single FIGURE is a diagrammatic view, partly in section, showing a brake valve device for a railway locomotive and constructed in accordance with the present invention.

DESCRIPTION

As shown in the drawing, a novel engineer's automatic brake valve device 1 is shown which is in part similar in construction to the brake valve device shown and described in U.S. Pat. No. 2,958,561, issued Nov. 1, 1960 to Harry C. May, and assigned to the assignee of the present application, but differing therefrom in respects hereinafter described. The brake valve device 1 comprises a sectionalized casing 2 containing a relay valve device 3, an equalizing reservoir supply valve device 4, a brake pipe cut-off valve device 5, a vent valve device 6, an emergency valve device 7, a suppression valve device 8, and a manually positionable selector valve device 9 for selectively conditioning the brake balve device 1 to operate a train brake apparatus when the brake valve device 1 is located on the leading locomotive of a multi-unit locomotive, or to cut-out control of brake pipe pressure by the brake valve device 1 when the locomotive is a trailing unit in a multiple-unit locomotive, or for conducting a brake pipe leakage test. The brake pipe cut-off valve device 5, the vent valve device 6, the emergency valve device 7, the suppression valve device 8, and the selector valve device 9 form no part of the present invention and may be identical in construction to the corresponding devices shown in the above-mentioned U.S. Pat. No. 2,958,561 and, therefore, are shown in outline in the drawing and will not be described in detail herein.

The relay valve device 3 comprises a diaphragm-type piston 10, which is subject opposingly to fluid pressures in a chamber 11 and a chamber 12 and is adapted through the medium of a coaxially arranged operating stem 13 to effect unseating of a disc-shaped exhaust valve 14 carried by an annular valve member 15 or to effect unseating of a disc-shaped supply valve 16 carried by a coaxially arranged annular valve member 17 according to whether the pressure in chamber 11 is less than or exceeds the pressure in chamber 12. The operating stem 13 is coaxially connected to the chamber 12 side of the diaphragm-type piston 10 and projects centrally through the annular valve member 15 and a chamber 18 and is adapted to be moved into abutting relationship with the left-hand face of the supply valve 16. Springs 19 and 20 respectively urge the valve members 15 and 17 towards each other for normally concurrently seating the exhaust valve 14 and the supply valve 16. The exhaust valve 14 controls communication between the chamber 18 and a chamber 21 which is open to atmosphere via an exhaust choke 22 whereas supply valve 16 controls communication between the chamber 18 and a chamber 23 that is always open via a passageway and corresponding pipe 24 to a main reservoir 25.

The chamber 18 is connected via a passageway 26 to a chamber (not shown) in the brake pipe cut-off valve device 5. As is fully described in the hereinbefore-mentioned U.S. Pat. No. 2,958,561, brake pipe cut-off valve device 5 comprises a valve (not shown) that controls communication from the above-mentioned chamber in this brake pipe cut-off valve device 5 to a second chamber (not shown) in this brake pipe cut-off valve device 5 which second chamber is connected via a passageway and corresponding pipe 27 to a brake pipe 28 that extends from the locomotive back through each car in the train.

According to the present invention, a cam shaft 29 that is rotatably mounted in the sectionalized casing 2 and has secured to its upper end a manually movable brake valve handle 30, carries thereon four spaced-apart cams as shown and described in the above-mentioned U.S. Pat. No. 2,958,561.

The uppermost of these four cams is denoted in the drawing by the reference numeral 31 and controls operation of the hereinbefore-mentioned equalizing reservoir supply valve device 4.

The equalizing reservoir supply valve device 4 comprises a diaphragm 32 subject opposingly to fluid under pressure in a delivery chamber 33 and to the force of a spring 34 in an atmospheric chamber 35. The degree of compression of the spring 34 may be manually adjusted by means of an adjusting screw 36 which has screw-threaded engagement with a screw-threaded bore in a bushing 37 press-fitted into a bore 38 in the sectionalized casing 2 to enable the shifting of a spring seat 39 against which rests the left-hand end of the spring 34. Therefore, the diaphragm 32 may be preloaded by a force corresponding to the desired normal fully charged equalizing reservoir pressure and hence brake pipe pressure, as will be understood from the subsequent description of the brake valve device 1.

As shown in the drawing, the casing 2 is provided with a bore 40 at the opposite ends of which are coaxial counterbores 41 and 42. An annular valve seat 43 is formed at the right-hand end of the bore 40 in which is mounted the fluted stem of a poppet-type supply valve 44. This valve 44 is urged toward the seat 43 by a spring 45 that is lighter than the spring 34. This spring 45 is interposed between a spring seat 46 that abuts the supply valve 44 and the end of a bottomed bore 47 provided in a spool-type valve 48 slidably mounted in the counterbore 42.

The spool-type valve 48 has formed integral therewith an operating stem 49 which is biased against the cam 31 by a spring 50. One end of this spring 50 rests against a first annular spring seat 51 that is disposed about the stem 49 and abuts a snap ring 52 inserted in a groove provided therefor in the stem 49. The other end of the spring 50 rests against one side of a second spring seat 53 the opposite side of which abuts the left-hand end of a counterbore 54 that is coaxial with the counterbore 42 and of larger diameter.

As shown in the drawing, the spool valve 48 is provided with an elongated peripheral annular groove 55. A pair of spaced-apart peripheral annular grooves adjacent the left-hand end of the groove 55 and a single peripheral annular groove adjacent the right-hand end of this groove 55 are provided in the spool valve 48 for receiving an O-ring seal 56. Each of these O-ring seals 56 form a seal with the wall surface of the counterbore 42 to prevent leakage of fluid under pressure past the respective O-ring seal 56.

As further shown in the drawing, the spool valve 48 is provided with a counterbore 57 that is coaxial with the bottomed bore 47 and with a port 58 which provides a constant communication between the elongated peripheral annular groove 55 and the interior of the counterbore 57, the left-hand end of which is provided with internal screw threads for receiving external screw threads provided on an annular member 59. In a manner hereinafter explained, this annular member 59 is adapted to be shifted in the direction of the right hand until it abuts the spring seat 46 so that further shifting in the direction of the right hand removes the force of the spring 45 from the supply valve 44 in order that this valve 44 may be unseated from the valve seat 43.

While the spool valve 48 occupies the position shown in the drawing, the groove 55 on and port 58 in this spool valve 48 establish a communication between the interior of the counterbore 57 and one end of a passageway 60 that opens at the wall surface of the counterbore 42. This passageway 60 extends through the casing 2 and at its other end opens into the passageway 24 which is connected to the main reservoir 25 in the manner hereinbefore explained.

As shown in the drawing, the outer periphery of the diaphragm 32 is clamped between the sectionalized casing 2 and a cover member 61 that constitutes one section of this sectionalized casing.

The inner periphery of the diaphragm 32 is clamped between a combined diaphragm follower and exhaust valve seat member 62 and an annular diaphragm follower plate 63 by an internally-threaded cup-shaped cap member 64 that has screw-threaded engagement with external screw threads provided therefor on the left-hand end of exhaust valve seat member 62.

The above-mentioned combined diaphragm follower and exhaust valve seat member 62 is provided with a bore 65 having an annular exhaust valve seat 66 formed at its right-hand end. This combined diaphragm follower and exhaust valve seat member 62 is also provided at its right-hand end with a spherical skirt portion 67 that is slidably guided in the counterbore 41.

Slidably mounted in the bore 65 is a fluted stem 68 of an exhaust valve 69 that controls communication between the delivery chamber 33 and atmosphere via a pair of ports 70 in a spring seat 71, a port 72 in the cap member 64 and an exhaust port 73 in the cover member 61.

A spring 74 interposed between the cap member 64 and the spring seat 71 is normally effective, via this spring seat and the fluted stem 68 of the exhaust valve 69, to unseat this exhaust valve 69 from its seat 66 and bias it against the end of the fluted stem of the supply valve 44.

Opening into the chamber 33 is one end of a passageway 75 that extends through the casing 2 to a chamber 76 therein. This chamber 76 is connected by a passageway 77 and correspondingly numbered pipe to an equalizing reservoir 78.

Opening into the chamber 11 in the relay valve device 3 is one end of a passageway 79 that extends through the casing 2 and is connected by a correspondingly numbered pipe to the pipe 77 intermediate the ends thereof. Consequently, the fluid under pressure supplied to the equalizing reservoir 78 flows through the pipe and passageway 79 to the chamber 11 to effect operation of the relay valve device 3 to cause variations of the pressure in the brake pipe 28 in the usual manner.

The brake valve handle 30 has five arcuately-spaced-apart positions, namely, release, holding, lap, service and emergency.

OPERATION

Assume initially that the apparatus is void of fluid under pressure and that the handle 30 of the engineer's brake valve device 1 is in its release position. Under these conditions, the various components of the apparatus will be in the respective positions in which they are shown in the drawing.

Whenever the handle 30 of the engineer's brake valve device 1 is moved to its release position, the contour of the cam 31 is such that the spring 50 is effective, via the spring seat 51, snap ring 52, and operating stem 49, to shift the spool valve 48 to the position shown in the drawing.

Since the spring 45 is lighter than the spring 34, as hereinbefore-mentioned, the spring 34 is effective to shift the diaphragm follower plate 63, diaphragm 32, combined diaphragm follower and exhaust valve seat member 62 having thereon exhaust valve seat 66, fluted stem 68, exhaust valve 69, supply valve 44 and spring seat 46 in the direction of the right hand against the yielding resistance of the spring 45 until the force of this spring 45 balances the force of the spring 34. When the forces of the springs 34 and 45 are thus balanced, the exhaust valve 69 is seated on its seat 66 and the supply valve 44 is unseated from its seat 43, as shown in the drawing, and the spool valve 48 occupies the position shown.

INITIAL CHARGING

To initially charge the apparatus, diesel engines are started for operating fluid compressors (not shown) to effect charging of the main reservoir 25.

Accordingly, with the handle 30 in its release position, fluid under pressure will flow from the main reservoir 25 to the delivery chamber 33 via pipe and passageway 24, passageway 60, groove 55 on and port 58 in spool valve 48, counterbore 57 in valve 48, past unseated supply valve 44 and bore 40, and thence to the equalizing reservoir 78 via passageway 75, chamber 76, and passageway and pipe 77.

Fluid under pressure will also flow from the delivery chamber 33 to a chamber 80 at the right-hand side of the diaphragm 32 via a passageway 81 having a choke 82 therein. Consequently, the chamber 80 and the equalizing reservoir 78 will be charged to a preselected normal charged value which is determined by the strength of the spring 34 that is interposed between the follower plate 63 and the spring seat 39 that rests against the end of the adjusting screw 36 by which the strength of the spring 34 may be varied to provide any desired preselected pressure in the equalizing reservoir 78 and chamber 80.

Fluid under pressure supplied to the pipe 77 and equalizing reservoir 78 in the manner described above will flow therefrom to the chamber 11 in the relay valve device 3. Fluid under pressure thus supplied to the chamber 11 will deflect the diaphragm-type piston 10 of this valve device 3 in the direction of the right hand to, via the valve operating stem 13, effect unseating of the supply valve 16 from a valve seat 83.

Upon unseating of valve 16 from its seat 83, fluid under pressure will flow from the chamber 23, which is connected to the main reservoir 25 via passageway and pipe 24, to the brake pipe 28 via the passageway 26, brake pipe cut-off valve device 5 and passageway and pipe 27. As shown in the drawing, the passageway 26 is connected to the chamber 12 via a passageway 84 and a choke 85. Consequently, part of the fluid under pressure supplied to the passageway 26 will flow to the chamber 12 via the passageway 84 and choke 85, until the pressure in this chamber 12 is increased to substantially the value of the equalizing reservoir pressure provided in the chamber 11, whereupon the piston 10 will be shifted in the direction of the left-hand to a lap position. As the piston 10 is thus shifted to its lap position, the spring 20 is rendered effective to move the supply valve 16 into seating contact with its seat 83 to cut off further flow of fluid under pressure from the main reservoir 25 to the chamber 12 and the brake pipe 28. Thus, the brake pipe will be charged to a normal charged value which corresponds to the normal charged value of the pressure carried in the equalizing reservoir 78 as determined by the force of the spring 34 acting on diaphragm 32 which force is in accordance with the manual adjustment of adjusting screw 36, as hereinbefore explained.

From the foregoing, it is apparent that upon movement of the handle 30 of the engineer's brake valve device 1 to its release position, the equalizing reservoir supply valve device 4 and the relay valve device 3 operate in the manner of self-lapping valve devices to effect automatic charging of the equalizing reservoir 78 and the brake pipe 28 to a preselected chosen value in the same manner as do the self-lapping type brake valve devices disclosed in the above-mentioned U.S. Pat. No. 2,905,507 and 2,958,561.

Subsequent to coupling a locomotive to a train of cars and prior to moving the train, the Interstate Commerce Commission requires that, after the train brake pipe and the brake equipment on all the cars in the train are charged to the normal pressure carried in the brake pipe, which pressure, for example, may be 70 pounds per square inch, the brakes on each car in the train must apply upon effecting a reduction of pressure in the brake pipe of 20 pounds per square inch. Consequently, before moving the train, the engineer will move the brake valve handle 30 arcuately out of its release position and to its service position, it being understood that upon movement of the handle 30 to its service position, subsequent to charging the train brake pipe to the above-mentioned normal pressure of seventy pounds per square inch, the pressure in the train brake pipe will be reduced 20 pounds per square inch by operation of the relay valve device 3 in the usual manner.

As the brake valve handle 30 is manually moved arcuately from its release position to its service position, the cam shaft 29 and cam 31 are rotated therewith. The contour of the cam 31 is such that this rotation thereof renders the spring 50 effective to shift the spring seat 51, snap ring 52, operating stem 49 and spool valve 48 in the direction of the right hand, as viewed in the drawing, until the spool valve 48 is in such a position that the O-ring 56 adjacent the left-hand end of the groove 55 on this valve 48 forms a seal with the wall surface of the counterbore 42 at a location that is on the right-hand side of the opening of the one end of the passageway 60 at the wall surface of this counterbore 42, it being understood that the O-ring seal 56 adjacent the left-hand end of the spool valve 48 forms a seal with the wall surface of the counterbore 42 on the left-hand side of this opening. Accordingly, communication between the main reservoir 25 and the equalizing reservoir 78 is cut off.

As the spool valve 48 is further shifted in the direction of the right hand by the spring 50, the annular member 59 carried by the spool valve 48 is moved into abutting relationship with the spring seat 46 so that as the valve 48 continues to be shifted in the direction of the right hand by the spring 50, this spring seat 46 is shifted in the direction of the right hand against the yielding resistance of the spring 45.

From the foregoing, it is apparent that upon the spool valve 48 reaching the position corresponding to the service position of the brake valve handle 30, the force of the spring 45 is removed from the supply valve 44 and exhaust valve 69. Therefore, the spring 74 is rendered effective, via the spring seat 71, to shift the exhaust valve 69 and the supply valve 44 in the direction of the right hand to unseat these valves respectively from their respective seats 66 and 43.

This unseating of the supply valve 44 from its seat 43 is without effect since the spool valve 48 has been moved to the position in which communication between the main reservoir 25 and the equalizing reservoir 78 is cut off, as explained above.

However, upon the unseating of the exhaust valve 69 from its seat 66, fluid under pressure will flow from the equalizing reservoir 78 to atmosphere via pipe and passageway 77, chamber 76, passageway 75, chamber 33, past unseated valve 69, bore 65, ports 70 in spring seat 71, port 72 in cap member 64, chamber 35 and exhaust port 73 in cover member 61.

Since chamber 11 in the relay valve device 3 is connected to the pipe 77 via passageway and pipe 79, fluid under pressure will also flow from this chamber 11 to atmosphere.

Fluid under pressure will now flow from both the chamber 11 and the equalizing reservoir 78 to atmosphere so long as the brake valve handle 30 remains in its service position.

It should be understood that the relay valve device 3 operates in the manner described in hereinbefore-mentioned U.S. Pat. No. 2,905,507 for the relay valve device 2 therein to release fluid under pressure from the brake pipe 28 to atmosphere so long as fluid under pressure is released from the relay valve device 3 and equalizing reservoir 78 shown in the drawing of the present application to atmosphere.

To terminate the release of fluid under pressure from the equalizing reservoir 78 and the chamber 11 in the relay valve device 3 to atmosphere, the engineer will move the brake valve handle 30 arcuately from its service position to its lap position, it being understood that this arcuate movement of the handle 30 is in the direction opposite the direction of movement of this handle 30 from its release position to its service position.

As the handle 30 is thus manually moved arcuately to its lap position, the cam shaft 29 and cam 31 are rotated therewith. The contour of the cam 31 is such that this rotation thereof shifts valve stem 49, spool valve 48 and annular member 59 in the direction of the left hand, as viewed in the drawing, thus rendering the spring 45 effective to shift the spring seat 46, supply valve 44 and exhaust valve 69 in the direction of the left hand as the annular member 59 is moved away from the spring seat 46 until the exhaust valve 69 is seated on its seat 66. It will be understood that the distance which the supply valve 44 is shifted in the direction of the left hand, upon movement of the brake valve handle 30 to its lap position, is not sufficient to effect seating of this valve 44 on its seat 43.

However, it should be further understood that when the handle 30 is moved to its lap position, the spool valve 48 is shifted to a position in which the two spaced-apart O-ring seals 56 on the left-hand side of the groove 55 on this valve 48 form seals with the wall surface of the counterbore 42 on the respective opposite sides of the opening of the one end of the passageway 60 at the wall surface of the counterbore 42. Therefore, communication between the main reservoir 25 and the equalizing reservoir 78 remains closed.

With the exhaust valve 69 seated on its seat 66, communication between the equalizing reservoir 78 and atmosphere is closed. Consequently, the pressure of the fluid in the equalizing reservoir 78 will remain constant so long as the brake valve handle 30 remains in its lap position unless fluid under pressure leaks from the equalizing reservoir 78 as the result of defective piping or some other cause.

The brake valve handle 30 may now be moved from its lap position to its release position whereupon the equalizing reservoir 78 and the brake pipe 28 will be charged in the manner hereinbefore explained to the desired preselected normal charged valve as determined by the setting of the adjusting screw 36.

The engineer may now start the train on its journey to the next terminal or station.

When descending a grade or a stop of the train is to be effected, the engineer will move the brake valve handle 30 from its release position to its service position and, after an interval of time corresponding to the degree of brake application desired, back to its lap position. When the engineer desires to release the brake application thus effected, he will return the brake valve handle 30 to its release position whereupon the equalizing reservoir 78 will be recharged to a preselected pressure determined by the position of the adjusting screw 36.

As hereinbefore stated, the brake valve handle 30 has a holding position. This holding position enables cams to be mounted on the cam shaft 29 to operate switches (not shown) which control circuits to application and release magnet valves mounted on cars hauled by the locomotive in such a manner that, upon moving the brake valve handle 30 to its holding position, the equalizing reservoir supply valve device 4 will effect charging of the equalizing reservoir 78 and the chamber 11 in the relay valve device 3 so that this relay valve device 3 will operate to effect charging of the brake pipe 28 to the preselected pressure, and the circuits to the application and release magnet valves are so energized that the train brakes remain applied.

Since such an electro-pneumatic brake system has been used for many years, these switches, circuits and magnet valves have been omitted from the drawing of the present application as they form no part of the present invention.

Having now described the invention, what I claim as new and desire to secure by Letters Patent, is:

1. In a brake valve device, of the type having a fluid-pressure-operated relay valve device for controlling the application and release of brakes in accordance with variations in the pressure of fluid supplied to said relay valve device, the combination with said relay valve device of a control valve device for controlling the supply of fluid under pressure to and the release of fluid under pressure from said relay valve device, said control valve device comprising:
- (a) release valve means for controlling the release of fluid under pressure from said fluid-pressure-operated relay valve device to atmosphere,
- (b) a first valve means arranged in abutting relation to said release valve means for controlling the supply of fluid under pressure to said fluid-pressure-operated relay valve device,
- (c) a first biasing means for providing a preselected biasing force corresponding to a desired maximum fluid pressure supplied to said relay valve device,
- (d) a movable abutment subject opposingly to the pressure of fluid supplied to said relay valve device and to said preselected biasing force of said first biasing means, said abutment being so arranged with respect to said release valve means and said first valve means as to enable said first biasing means to effect closing of said release valve means and opening of said first valve means so long as as said preselected biasing force exceeds the fluid pressure force of the fluid supplied to the relay valve device thereby enabling said control valve device to operate as a self-lapping valve device to supply fluid under pressure to said relay valve device until said fluid pressure force is substantially equal to said preselected biasing force, wherein the improvement comprises:
- (e) a second valve means shiftable from a first position, in which it effects the supply of fluid under pressure to said first valve means, to a second and a third position in each of which positions said supply of fluid under pressure is cut off,
- (f) a second biasing means so interposed between said first and second valve means as to, while said second valve means is in its said first and second positions, transmit a force to said first valve means to effect the closing thereof upon said fluid pressure force becoming substantially equal to said preselected biasing force,
- (g) means carried by said second valve means for rendering said second biasing means ineffective to close said first valve means only upon shifting of said second valve means to its said third position,
- (h) a third biasing means for effecting shifting of said second valve means from its said first position to its said second and third positions,
- (i) operator-controlled means selectively operable to a first position to effect shifting of said second valve means against the yielding resistance of said third biasing means to its said first position in which fluid under pressure is supplied via said first and second valve means in series to said relay valve device until said fluid pressure force is substantially equal to said preselected biasing force, to a second position in which said third biasing means is rendered effective to shift said second valve means from its first position to its second position in which the supply of fluid under pressure to said second valve means is cut off, and to a third position in which said supply of fluid under pressure to said second valve means remains cut off, and said means carried by said second valve means renders said second biasing means ineffective to close said first valve means, and
- (j) a fourth biasing means carried by said movable abutment and operable to effect operation of said release valve means to release fluid under pressure from said fluid-pressure-operated relay valve device to atmosphere only upon shifting of said second valve means to its said third position, in which said means carried by second valve means renders said second biasing means ineffective to transmit a force to said first valve means to effect closing thereof.

2. A brake valve device, as recited in claim 1, further characterized in that said release valve means and said first valve means each comprise:
- (a) a valve seat, the valve seat of said release valve means being carried on said movable abutment, and the valve seat of said first valve means being stationary, and
- (b) a poppet-type valve having a fluted stem, said poppet-type valves being so coaxially arranged in tandem relation that the fluted stem of said poppet-type valve of said first valve means abuts the poppet-type valve of said release valve means whereby said first biasing means, in the absence of a fluid pressure on said abutment that is substantially equal to said desired maximum fluid pressure supplied to said relay valve device, is effective to maintain the poppet-type valve of said release valve means seated on its seat and the poppet-type valve of said first valve means unseated from its seat to enable the supply of fluid under pressure to said relay valve device until said desired maximum fluid pressure in said relay valve device is attained.

3. A brake valve device, as recited in claim 1, further characterized in that said release valve means and said first valve means each comprise a poppet-type valve having a fluted stem and a valve seat, said seat of said release valve means being carried by said movable abutment and said seat of said first valve means being stationary, and said poppet-type valves being so coaxially arranged in tandem relation that the fluted stem of the poppet valve of said first valve means abuts the poppet valve of said release valve means whereby said first biasing means is effective to maintain said seat of said release valve means in seating engagement with the poppet-type valve of said release valve means, and said poppet-type valve of said first valve means unseated from its seat so long as said preselected biasing force exceeds the fluid pressure force of the fluid supplied to the relay valve device, and by means for effecting seating of said poppet-type valve of said first valve means on its seat upon said fluid pressure force increasing to a value substantially equal to said preselected biasing force to cut off flow of fluid under pressure to the relay valve device.

4. A brake valve device, as recited in claim 1, further characterized in that said second valve means comprises:
- (a) a cup-shaped spool-type valve having thereon an elongated peripheral annular groove connected to the interior thereof by a port therein, and (b) sealing means carried adjacent the respective opposite ends of said groove, said sealing means adjacent one end comprising a pair of spaced-apart seals that are so disposed as to enable the supply of fluid under pressure to said first valve means via said elongated groove and said port in said first position of said second valve means, and the cut off of said supply of fluid under pressure to said first valve means in said second and third positions of said second valve means.

5. A brake valve device, as recited in claim 4, further characterized in that said means carried by said second valve means comprises an annular member carried by and within said cup-shaped spool-type valve adjacent the open end thereof, and said second biasing means comprises:
  (a) a spring seat disposed within said cup-shaped spool-type valve on the side of said annular member opposite said open end of said spool-type valve, and
  (b) a spring interposed between said spring seat and said cup-shaped spool-type valve, said spring being effective, via said spring seat, while said second valve means is in its first position, to cause said first valve means to cut off the supply of fluid under pressure to said fluid-pressure-operated relay valve device in response to an increase in said fluid pressure force to a value substantially equal to said preselected biasing force.

6. A brake valve device, as recited in claim 4, further characterized in that said cup-shaped spool-type valve is provided with a valve operating stem and a spring seat mounted thereon against which rests said third biasing means, and said operator-controlled means comprises:
  (a) a cam having such a contour and so disposed with respect to said valve operating stem that rotation of said cam in one direction is effective, via said operating stem, to shift said spool-type valve against the yielding resistance of said third biasing means to said first position of said second valve means, and rotation of said cam in an opposite direction renders said third biasing means effective, via said spring seat, to shift said spool-type valve to said second and third positions of said second valve means,
  (b) a cam shaft on which said cam is mounted for rotation therewith, and
  (c) a handle mounted on said cam shaft for effecting manual rotation of said cam and cam shaft.

7. A brake valve device, as recited in claim 4, further characterized in that, while said spool-type valve is in the second position of said second valve means, said spool valve cuts off the supply of fluid under pressure to said first valve means, and said first biasing means is effective to maintan said release valve closed so that fluid under pressure is neither supplied to nor released from said relay valve device.

8. A brake valve device, as recited in claim 4, further characterized in that said first valve means comprises a valve and a valve seat, and by a casing section having a bore at one end of which is formed said valve seat and a coaxial counterbore in which is slidably mounted said spool-type valve, said casing section being further provided with a fluid pressure supply passageway therein which opens at one end at the wall surface of said counterbore at such a location that, while said spool-type valve occupies the first position of said second valve means, said elongated groove on and said port in said spool valve establish a communication between said one end of said passageway and said first valve means, and, while said spool-type valve occupies the second and third positions of said second valve means, said spaced-apart seals adjacent said one end of said spool-type valve form a seal with the wall surface of said bore at locations that are on the respective opposite sides of the opening of said one end of said passageway whereby said communication between said one end and said first valve means is closed.

9. A brake valve device, as recited in claim 8, further characterized in that said first biasing means, said abutment, said release valve means and said first valve means, while said spool valve occupies the first position of said second valve means, cooperate to enable said control valve device to operate as a self-lapping valve device to supply fluid under pressure to said relay valve device until said fluid pressure force is substantially equal to said preselected biasing force, and said spaced apart seals adjacent said one end of said spool valve cooperate with the wall surface of said counterbore, while said spool valve occupies the second position of said second valve means, to so cooperate with said release valve means as to enable said control valve device to operate as a manually lapped control valve device to cut off release of fluid under pressure from said relay valve device to atmosphere, and, while said spool occupies the third position of said second valve means, to so cooperate with said release valve means as to enable said control valve device to operate as a manually applied control valve device to release fluid under pressure from said relay valve device to atmosphere to cause said relay valve device to operate to effect a brake application.

10. A brake valve device, as recited in claim 9, further characterized in that the degree of pressure reduction effected in said relay valve device upon operation of said control valve device to release fluid under pressure therefrom varies in accordance with the same time said spool valve occupies the third position of said second valve means prior to manual movement of said spool valve from said third position to the second position of said second valve means by said operator-controlled means.

* * * * *

UNITED STATES PATENT AND TRADEMARK OFFICE
CERTIFICATE OF CORRECTION

PATENT NO. : 4,113,320

DATED : September 12, 1978

INVENTOR(S) : Richard F. Balukin

It is certified that error appears in the above-identified patent and that said Letters Patent are hereby corrected as shown below:

Column 12, line 35, after "spool" insert --valve-- line 46, after "in accordance with the"

delete --same--

Signed and Sealed this

Twenty-second Day of May 1979

[SEAL]

Attest:

RUTH C. MASON
Attesting Officer

DONALD W. BANNER
Commissioner of Patents and Trademarks